US010563283B2

(12) United States Patent
Nelson et al.

(10) Patent No.: US 10,563,283 B2
(45) Date of Patent: Feb. 18, 2020

(54) METHODS, MATERIALS AND TECHNIQUES FOR PRECIOUS METAL RECOVERY

(71) Applicant: Enviroleach Technologies Inc., Burnaby (CA)

(72) Inventors: Duane Nelson, North Vancouver (CA); Steve Scott, Fort Mohave, AZ (US); Mohammad Doostmohammadi, North Vancouver (CA); Hanif Jafari, North Vancouver (CA)

(73) Assignee: Enviroleach Technologies Inc., Burnaby (CA)

( * ) Notice: Subject to any disclaimer, the term of this patent is extended or adjusted under 35 U.S.C. 154(b) by 216 days.

(21) Appl. No.: 15/631,252

(22) Filed: Jun. 23, 2017

(65) Prior Publication Data

US 2017/0369967 A1  Dec. 28, 2017

Related U.S. Application Data

(60) Provisional application No. 62/512,462, filed on May 30, 2017, provisional application No. 62/421,483, (Continued)

(51) Int. Cl.
*C22B 3/10* (2006.01)
*C22B 3/16* (2006.01)
(Continued)

(52) U.S. Cl.
CPC ............... *C22B 3/10* (2013.01); *C22B 3/045* (2013.01); *C22B 3/06* (2013.01); *C22B 3/1608* (2013.01);
(Continued)

(58) Field of Classification Search
CPC ......... C22B 3/1608; C22B 3/045; C22B 3/20; C22B 7/006; C22B 11/04; C22B 3/10; C22B 3/06; C25C 1/00; C25D 3/10
See application file for complete search history.

(56) References Cited

U.S. PATENT DOCUMENTS 3,957,505 A      5/1976   Homick et al.
4,234,396 A  *  11/1980   Perakh ................. C25D 3/04
                                                         205/283
(Continued)

FOREIGN PATENT DOCUMENTS

CN       105018725 A       11/2015
GB         2379223 A  *     3/2003  ............. A01N 59/14
(Continued)

OTHER PUBLICATIONS

JP 2005-154892 A machine translation of the description. (Year: 2005).*
(Continued)

*Primary Examiner* — Tima M. McGuthry-Banks
(74) *Attorney, Agent, or Firm* — Merchant & Gould P.C.

(57) ABSTRACT

Materials and methods for precious metal recovery are disclosed. Usable leaching solutions are preferably aqueous based and include appropriate materials in sufficient quantities to solubilize and stabilize precious metal. Such materials typically include oxidant material. Some or all of the oxidant material can be, in some instances, generated in-situ. The leaching solution is typically contacted with a substrate having a target precious metal, thereby solubilizing precious metal to form a stable, pregnant solution. The precious metal can then be recovered from the pregnant solution. In some instances, components of the leaching solution can be regenerated and reused in subsequent leaching.

14 Claims, 8 Drawing Sheets

Related U.S. Application Data filed on Nov. 14, 2016, provisional application No. 62/354,393, filed on Jun. 24, 2016.

(51) Int. Cl.

| | | |
|---|---|---|
| *C22B 3/20* | (2006.01) | |
| *C25C 1/00* | (2006.01) | |
| *C25D 3/10* | (2006.01) | |
| *C22B 3/00* | (2006.01) | |
| *C22B 7/00* | (2006.01) | |
| *C22B 3/04* | (2006.01) | |
| *C22B 3/06* | (2006.01) | |

(52) U.S. Cl.
CPC .............. *C22B 3/20* (2013.01); *C22B 7/006* (2013.01); *C22B 11/04* (2013.01); *C25C 1/00* (2013.01); *C25D 3/10* (2013.01); *Y02P 10/234* (2015.11); *Y02P 10/238* (2015.11)

(56) References Cited

U.S. PATENT DOCUMENTS

| | | | |
|---|---|---|---|
| 4,557,759 A | 12/1985 | McGrew et al. | |
| 4,734,171 A * | 3/1988 | Murphy | C01G 7/003 205/566 |
| 4,859,293 A | 8/1989 | Hirako et al. | |
| 4,911,804 A * | 3/1990 | Dickson | C22B 3/045 204/237 |
| 5,051,128 A * | 9/1991 | Kubo | C22B 3/24 423/24 |
| 7,166,145 B1 | 1/2007 | Han | |
| 7,407,569 B2 | 8/2008 | Mizutani et al. | |
| 7,537,741 B2 | 5/2009 | Lalancette | |
| 9,051,626 B2 | 6/2015 | Lalancette et al. | |
| 9,206,491 B2 | 12/2015 | Lalancette et al. | |
| 9,206,492 B2 | 12/2015 | Lalancette et al. | |
| 9,215,813 B2 | 12/2015 | Brosseau et al. | |
| 9,221,114 B2 | 12/2015 | Chen et al. | |
| 2008/0073614 A1 * | 3/2008 | Akiyama | C23F 1/30 252/79.3 |
| 2014/0191019 A1 * | 7/2014 | Chen | H05K 3/22 228/264 |
| 2015/0033913 A1 * | 2/2015 | Lalancette | C22B 3/045 75/711 |
| 2016/0222519 A1 * | 8/2016 | Janssen | C23C 18/54 |
| 2019/0017145 A1 | 1/2019 | Nelson et al. | |
| 2019/0233917 A1 | 8/2019 | Nelson et al. | |

FOREIGN PATENT DOCUMENTS

| | | | |
|---|---|---|---|
| JP | S6324090 | 2/1988 | |
| JP | 2005154892 A | 6/2005 | |
| WO | WO-8606738 A1 * | 11/1986 | .............. C09J 4/00 |
| WO | 1987003623 A1 | 6/1987 | |
| WO | 20000043574 A1 | 7/2000 | |
| WO | 2011130622 A1 | 10/2011 | |

OTHER PUBLICATIONS

Li et al., The electrochemical oxidation of biologically treated citric acid wastewater in a continuous-flow three-dimensional electrode reactor, Chemical Engineering Journal, vol. 232, Oct. 2013, pp. 495-502.

Written Opinion and International Search Report for PCT/IB2017/000958 dated Nov. 21, 2017, 13pgs.

Aylmore, A.G., Alternatives to Cyanide for Leaching Gold Ores—Chapter 27, Gold Ore Processing: Project Development and Operations, Mike Adams, Ed., Elsevier, pp. 447-484, May 17, 2016, 37pgs.

International Search Report and the Written Opinion of the International Searching Authority in PCT/IB2019/000119 dated Jun. 27, 2019, 10 pages.

Hojo et al., entitled "Dilute nitric or nitrous acid solution containing halide ions as effective media for pure gold dissolution," Phys. Chem. Chem Phys., 2015, 17, pp. 19948-19956.

\* cited by examiner

METHODS, MATERIALS AND TECHNIQUES FOR PRECIOUS METAL RECOVERY

CROSS-REFERENCE

The present application claims priority, to the extent appropriate, to each of the following applications: U.S. Provisional Patent Application No. 62/354,393, filed Jun. 24, 2016; U.S. Provisional Patent Application No. 62/421,483, filed Nov. 14, 2016; and U.S. Provisional Patent Application No. 62/512,462, filed May 30, 2017, wherein the disclosure of each application is hereby incorporated by reference in their entirety.

FIELD OF DISCLOSURE

The present disclosure relates to methods, materials and techniques for precious metal recovery. Example applications relate to the preparation of leaching solutions and use of resulting leaching solutions in the recovery of precious metals from substrates, such as gold bearing ores, concentrates, anodic slimes and residues, electronic waste, metallic scrap, and materials previously treated by roasting, bacterial leaching, pressure leaching, or other techniques used to liberate precious metal from its matrix. Many of the materials, methods, and techniques disclosed herein are particularly advantageous for gold recovery.

BACKGROUND

Precious metal in substrate such as mined ore can be recovered by contacting the substrate with leaching solution. Typically, the leaching solution is an aqueous-based solution. Generally, the leaching solution is contacted with substrate to solubilize the precious metal. Thereafter, valuable components of the solution, such as the solubilized precious metal, are recovered.

Issues with past approaches relate to: efficiency of leaching recovery; avoidance of undesirable materials such as cyanide materials; and generation of stable solutions. Improvements in at least one, and sometimes more, of these issues are sought.

SUMMARY

Techniques and materials disclosed herein relate to extracting precious metal from substrate into solution, for example, using leaching solutions. In addition, techniques and materials disclosed herein relate to methods for recovering precious metal from the leaching solutions. Techniques and materials disclosed herein also relate to methods for regenerating components of leaching solutions.

There is no specific requirement that a material, technique or method relating to a leaching solution include all of the details characterized herein, in order to obtain some benefit according to the present disclosure. Thus, the specific examples characterized are meant to be exemplary applications of the techniques described, and alternatives are possible.

According to certain techniques, an aqueous-based leaching solution for precious metal includes iodine materials, such as triiodide, iodide material, and/or iodate material, carboxylic acid material, and optionally chlorine and/or bromine material in an amount effective to enhance leaching. Carboxylic acid material includes citric acid, acetic acid, and/or a combination of citric acid and acetic acid. Boric acid can be used independently from, or in combination with, the carboxylic acid material.

In general, an aqueous-based leaching solution for precious metal includes water-soluble, carboxylic acid in an amount sufficient to enhance leaching and iodide material in an amount effective to enhance leaching. Preferably, the leaching solution has a pH of no greater than 7.

In various applications, a stable, aqueous-based, precious metal-containing leachate results from leaching precious metal oxidizable with an aqueous-based leach solution. Various leaching methods are contemplated, such as continuous or batch stirred tank agitation, vat leaching, or in situ techniques such as dump and heap leaching.

Generally, a method of recovering a precious metal from a precious metal-containing pregnant leach solution includes recovering the precious metal by various methods, such as electrowinning, precipitation, cementation, ion exchange, and/or adsorption onto activated carbon, thereby generating a barren solution and passing current through the barren solution having a triiodide precursor to increase a triiodide content of the barren solution.

DETAILED DESCRIPTION

Figure 1:
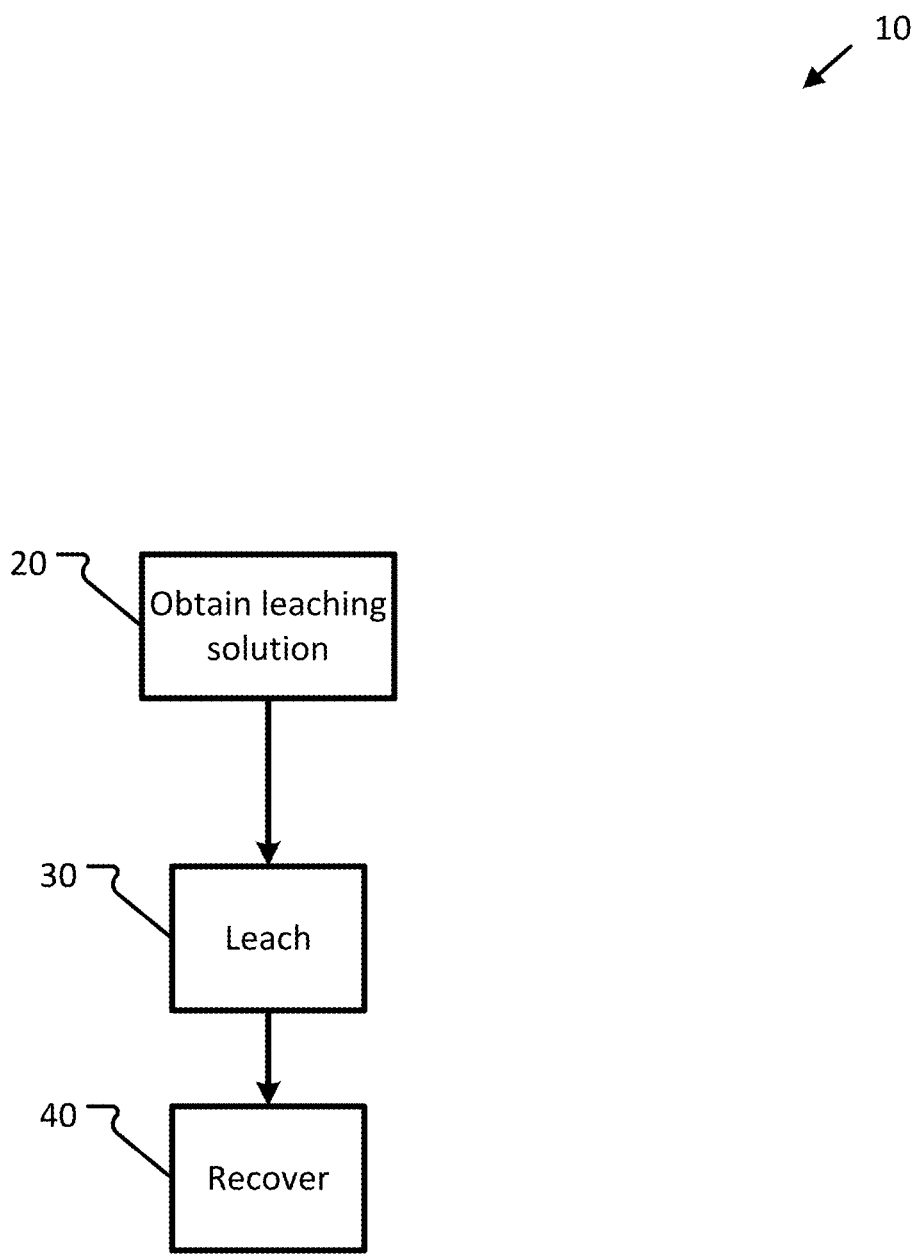
FIG. 1 is a schematic flow diagram indicating steps in a process for precious metal recovery.

I. Issues, Materials, and Techniques Related to Precious Metals Recovery Generally A. General Precious metal recovery involves separation of the precious metal, such as gold, from ore, mining tails, and/or waste such as electronic waste. The techniques disclosed and contemplated herein include treating substrate with aqueous-based leach solution to produce a "pregnant solution." Herein, the term "pregnant solution" is meant to refer to a leach solution having leached precious metal therein.

Also described herein are processes used to recover the precious metal from the pregnant solution and processes relating to regeneration of various components of the aqueous based leach solution. The techniques disclosed and contemplated by this disclosure are particularly well-adapted for processes that involve the recovery of gold as the precious metal.

B. Leaching Solutions

Aqueous-based leaching solutions usable in techniques characterized herein are those that, when in contact with substrate, solubilize at least a portion of precious metal in the substrate by oxidizing the precious metal. Typical leaching solutions characterized herein are effective under a wide pH range, such as between a pH of 3 to 10. Typically, the aqueous-based solutions characterized herein have at or near-neutral pH, for instance, in the range of pH 4-7. Usually, the aqueous-based solutions characterized herein have a pH of at least 4. Preferably, the aqueous-based leaching solutions characterized herein are provided with a pH within the range 5-7, inclusive. As used herein, "inclusive", in this context, means the end points are included within the range.

Typically, leaching solutions characterized herein preferably are practiced in a manner that avoid the use of soluble, inorganic cyanide materials (such as cyanide salts). Cyanide materials are preferably avoided in the leaching solutions characterized herein because, at least, they are hazardous and subject to stringent environmental regulations.

Typically, leaching solutions characterized herein include iodate material, iodide material, and one or more weak acids. During typical leaching operations, electrochemical cell(s) are used to maintain the oxidation reduction potential of leaching solutions. Typically, acid is added to a barren solution (the solution resulting from removing precious metal from a leaching solution) to partially regenerate the barren solution before or after using electrochemical cell(s) to fully regenerate the leaching solution for further use. Typically, divided electrochemical cells are used to regenerate the leaching solution.

It is noted that in mining applications, the leaching solution is sometimes referred to as a lixiviant. Herein, when the term "leaching solution" is used, it is meant to include lixiviant(s).

1. Iodine Material

The instantly-disclosed aqueous-based leaching solutions include iodine material, which includes iodide material and iodate material. Iodide material includes compounds capable of forming iodide in an aqueous solution, such as triiodide. Iodide material includes iodide salt, such as KI.

Preferably, pure elemental iodine is not added to the leaching solution. Rather, without being bound by a particular theory, it is speculated that triiodide material is formed electrochemically. Without being bound by a particular theory, it is speculated that iodide material is useful for complexing and solubility of precious metal.

The instantly-disclosed aqueous-based leaching solutions also include iodate material. Iodate material includes compounds capable of forming iodate in an aqueous solution. Example iodate material includes iodate salt, such as potassium iodate ($KIO_3$).

2. Acidic Components

As indicated above, the leaching solutions disclosed herein include acidic material. The acidity is preferably provided by weak acid material. As used herein, weak acid is intended to mean that the acid does not have any acid group having a $pK_a$ less than 3. Put another way, each $pK_a$ of the weak acid is greater than 3. Weak acid material can facilitate leaching of the target metal. Additionally, without being bound by a particular theory, it is speculated that weak acid material improves the ability of the leaching solution to hold the precious metal in solution. In many instances, the weak acid material is a carboxylic acid. As used herein, weak acid material includes the acid, a salt of the acid, or a combination thereof.

One example of water-soluble, carboxylic acid material is citric acid. Citric acid is a weak, organic acid. Citric acid has $pK_a$ values of 3.13, 4.76, and 6.4. Another example is acetic acid.

Without being bound by a particular theory, it is speculated that citric acid improves the ability of the instant leaching solutions to solubilize precious metal. Although citric acid is preferable, acetic acid can be used in place of citric acid.

In some instances, the leaching solutions can include both citric acid and acetic acid material. Acetic acid material includes glacial acetic acid, dry acetic acid, or equivalents thereof.

Another example of an acidic component is boric acid. Boric acid is a weak, inorganic acid. Boric acid has $pK_a$ values of 9.24, 12.4 and 13.3. Without being bound by a particular theory, it is speculated that boric acid improves the ability of the instant leaching solutions to solubilize precious metal. Without being bound by a particular theory, it is speculated that boric acid acts as a buffer in the instant leaching solutions. Optionally, borates can be used in place of boric acid. Storage stability is discussed in more detail below.

3. Bromine or Chlorine Material

The instantly-disclosed aqueous-based leaching solutions also optionally include bromine material or chlorine material ("halogen material"). Halogen material is usually added as a sodium salt or a potassium salt. Typical halogen material is chloride salt or bromide salt. Accordingly, example halogen material can include bromide salt material, such as potassium bromide and/or sodium bromide, and chloride salt material, such as potassium chloride and/or sodium chloride.

4. Oxidants

The leaching solutions disclosed herein preferably include triiodide material and iodide material for dissolution of the precious metal during leaching. Triiodide material is typically generated through oxidation of iodide electrochemically on electrochemical cell anode and/or optionally by addition of a chemical oxidant such as hypochlorite, hydrogen peroxide, persulfate (e.g., potassium monopersulfate, potassium persulfate, and sodium persulfate), ozone, or other materials capable of oxidizing iodide to iodine. Alternatively, triiodide material can be generated using iodate material with addition of acid materials (i.e., mixing iodate material with an acid).

Preferably, triiodide material is generated in-situ through electrochemical approaches from relatively inexpensive, safe and easy to use sources, such as iodide materials and iodate materials. Examples of triiodide material production using a chemical oxidant are provided below. An example pathway using hydrogen peroxide starting material is as follows:

$$H_2O_2 + 2I^- + 2H^+ \rightarrow I_2 + 2H_2O \quad (1)$$

The reaction in equation (1) is followed by:

$$I_2 + I^- \rightarrow I_3^- \quad (2)$$

Another example pathway is using persulfate.

$$S_2O_8^{2-} + 2I^- \rightarrow I_2 + 2SO_4^{2-} \quad (3)$$

The reaction in equation (3) is followed by reaction of iodine with iodide to form triiodide ion:

$$I_2 + I^- \rightarrow I_3^- \quad (4)$$

5. Cyanide Avoidance

Many precious metal recovery operations use cyanide-based solutions for the leachate. Generally, in contrast, cyanides and cyanide salts are avoided or limited in the instantly-disclosed leaching solutions. Because the instant leaching solutions preferably have no cyanide added, the disclosed solutions avoid the environmental impacts, hazards, and regulations attendant to the use of cyanide.

Preferably, the leaching solutions disclosed herein have no more than 0.0001 wt % cyanide (e.g. NaCN) added. As used herein, "wt %" means the weight percent of all ingredients, including the solvent, combined to form the leaching solution. Most preferably, the leaching solutions disclosed herein have no cyanide (e.g. NaCN) added. However, the disclosed leaching solutions can acquire some cyanide during the leaching process.

C. Leaching Techniques: Precious Metal Solubility

Upon contact with substrate containing precious metal, the leaching solution solubilizes the precious metal. Contact time between the leaching solution and the substrate can be selected to achieve desired recovery targets and processing goals. The addition of water-soluble, carboxylic acid to the leaching solution improves the ability of the instant leaching solutions to solubilize precious metal.

D. Leaching Techniques: Storage Stability

After leaching precious metal from the substrate, the pregnant leach solution can be stored or transported. Days, weeks, or months can pass before the precious metals are extracted from pregnant leach solutions. The instantly-disclosed leaching solutions include additive that improve the storage stability of the precious metal.

In preferred processes, the precious metal stays in solution during a storage period without requiring cyanide materials, termed "storage stable." Herein, "storage stable" in this context means that the pregnant solution can stand for at least an hour without agitation and without the precious metal falling out of the pregnant solution. Pregnant leaching solutions disclosed herein are preferably storage stable for days. Often, pregnant leaching solutions disclosed herein are storage stable for weeks. In some instances, pregnant leaching solutions disclosed herein are storage stable for months.

The pregnant leaching solutions disclosed herein are storage stable under typical conditions, such as ambient temperature and pressure. Without being bound by a particular theory, it is speculated that carboxylic acid material and/or boric acid enhances the stability of the pregnant leach solution, such that the pregnant leach solution can be stored for weeks, months, or longer.

E. Preferred Avoidance of Components in the Leaching Solution

Although strong acids can be used, the instantly-disclosed leaching solutions preferably avoid the use of strong acids. For instance, harsh acids are generally avoided. As an example, sulfuric acid (having $pK_a$ values of −3 and 1.99) is preferably avoided. That said, strong acids such as sulfuric acids and hydrochloric acids can be used in addition to the weak acids discussed above.

II. Example Processing

A. General Process

Figure 2:
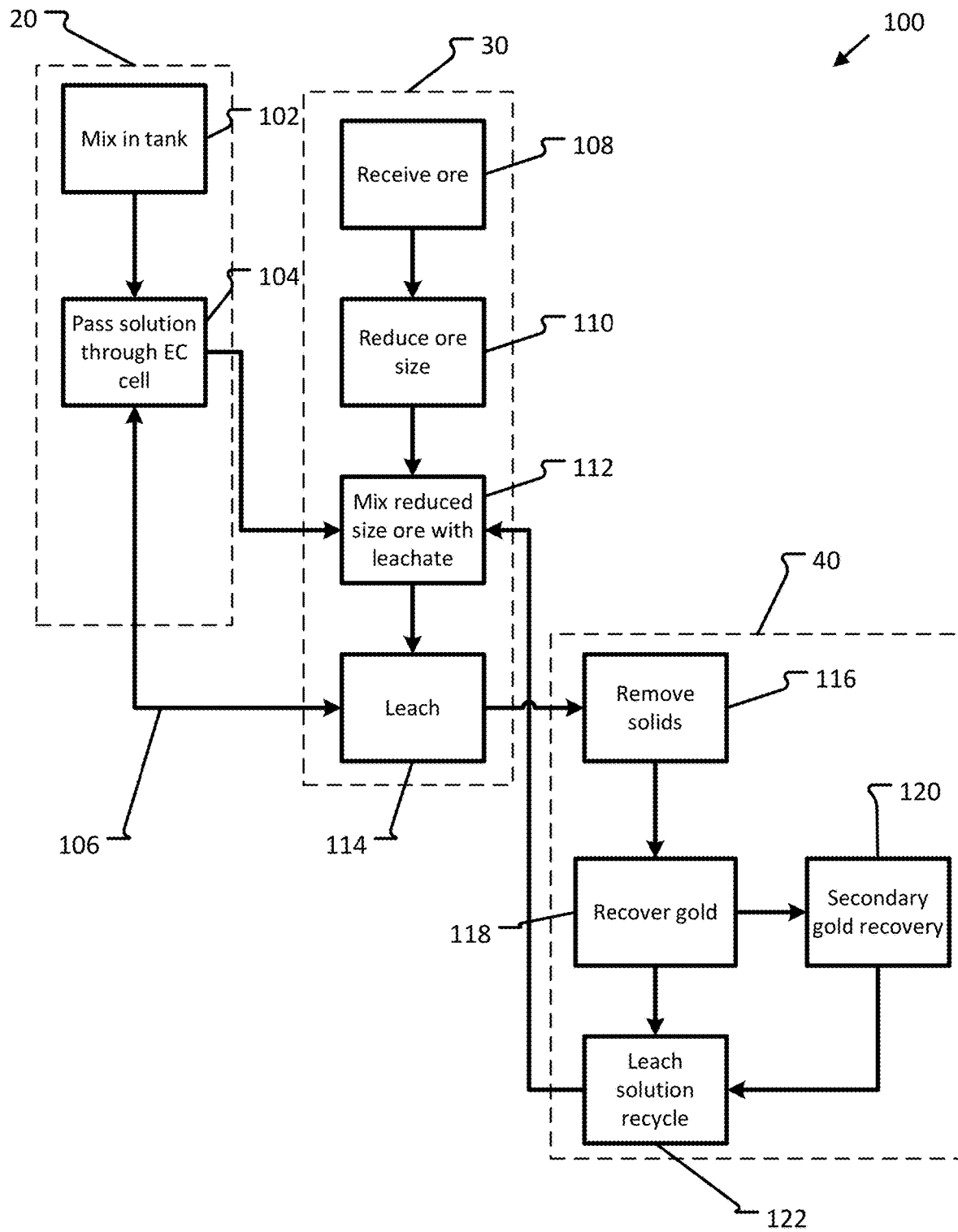
FIG. 2 is a schematic flow diagram in accordance with FIG. 1 indicating example steps in a recovery of gold from an ore.

FIG. 1 is an example embodiment of method 10 of recovering precious metal using leaching solution. The method 10 includes obtaining leaching solution (operation 20), leaching (operation 30), and recovering (operation 40). FIG. 2 shows a more detailed method 100 for recovering precious metal using leaching solutions and is discussed below.

The example method 10 begins by obtaining leaching solution (operation 20). The leaching solution can be pre-made and obtained from a third party or prepared on-site. Generating the leaching solution includes preparing an aqueous based solution and raising the oxidation-reduction potential (ORP) of the solution. As part of preparing the aqueous-based solution, one or more additives are added. Each additive is present in an amount sufficient to oxidize, solubilize, and/or stabilize the precious metal. Usable additives and methods of preparing the leaching solution are discussed below in more detail.

After the leaching solution is obtained (operation 20), substrate containing precious metal is contacted with the leaching solution (operation 30). Leaching (operation 30) strips precious metal from the substrate and forms complexes such that the precious metal is in solution, creating a pregnant solution. When the precious metal is in solution, then the solid substrates can be separated from the pregnant solution. Removing solids from the pregnant solution creates a clear solution that improves the efficacy of precious metal recovery steps.

Next, precious metal is recovered from the solution (operation 40). Recovering precious metal (operation 40) can include one or more operations. Precious metal recovery operations can include methods such as electrowinning, precipitation, cementation or loading onto activated carbon, and/or ion exchange resins, or any combination thereof.

Recovery (operation 40) can also include recovering one or more additives by an electrolysis step and/or reactivating the leaching solution. The leaching solution is then reused for subsequent leaching.

B. Example Process for Producing Leaching Solution and Recovering Precious Metal FIG. 2 is an example embodiment of method 100 for generating and using aqueous-based leaching solution. The method 100 shown includes mixing in tank (operation 102), passing solution through electrochemical (EC) cell (operation 104), receiving ore (operation 108), reducing ore size (operation 110), mixing reduced-in-size ore with leachate (operation 112), leaching (operation 114), removing solids (operation 116), recovering gold (operation 118), secondary gold recovery (operation 120), and leach solution recycle (operation 122). Other embodiments can include more or fewer operations.

The embodiment of method 100 begins by obtaining the leaching solution (operation 20). As shown in FIG. 2, the leaching solution is obtained by generating the solution on-site. Specifically, obtaining the leaching solution (operation 20) includes combining ingredients in an aqueous solution in a tank (operation 102) and then passing the solution through an electrochemical cell (operation 104). When in solution, or after current is passed through the solution, the ingredients produce one or more oxidants.

Generally, iodide material, and carboxylic acid material are combined with water and then agitated or mixed during operation 102. Optionally, iodate material is also included. For example, potassium iodide, potassium iodate, and citric acid are combined with water in a stirred tank during operation 102. Other additives, such as those discussed within this disclosure (e.g., bromide salt), can also be added to the aqueous mixture.

The tank's contents can be agitated or stirred using a baffle, stirrer, or other apparatus designed to promote mixing of tank contents. The amount of ingredients and the tank size can be scaled to accommodate desired precious metal recovery requirements. Specific examples of ingredients and their relative amounts are provided below in the Example section.

After the ingredients are mixed, the solution is directed to an electrified cell (operation 104). For instance, the solution prepared during operation 104 is passed through an electrochemical cell. The electrochemical cell can be divided or undivided. Additionally, more than one electrochemical cell can be used, where the cells are arranged in series and/or in parallel. Typical commercially-available electrochemical cells can be used during operation 104.

While passing solution through an electrochemical cell for a given period of time (operation 104), the ORP of the solution is monitored. Preferably, the solution is electrified until the ORP is raised to at least 540 mV SHE (standard hydrogen electrode). More preferably, the solution is electrified until the ORP is raised to at least 570 mV SHE. The resulting mixture can be used as leaching solution and stored in a separate tank until it is used in operation 112, discussed below.

Method 100 also includes receiving ore (operation 108) containing precious metal. The ore is obtained from one or more mining operations that can be local or remote. The ore in the embodiment of method 100 includes gold, although the method 100 can be used to recover other types of precious metal.

Although the received ore can be crushed, in some embodiments, the ore is further reduced in size (operation 110). Reducing the ore size can include passing the mined ore through a mill and/or a crushing circuit. An example mill is described in U.S. patent application Ser. No. 15/063,725, titled "MILL."

When the ore is reduced in size and the leaching solution is prepared, both are combined (operation 112). Mixing the reduced-in-size ore with the leaching solution (operation 112) is preferably a batch process, although mixing is optionally performed as a continuous process.

Then the leaching solution and ore undergo leaching (operation 114). Preferably, leaching (operation 114) is conducted as a tank leach. More preferably, leaching (operation 114) is conducted as an agitated tank leach. In other embodiments, vat leaching, heap leaching, and/or in-situ leaching can be used in addition to, or in place of, tank leaching. Tank leaching (operation 114) proceeds at ambient temperature and atmospheric pressure for a predetermined period of time. In various implementations, leach time can vary from a few minutes to over 24 hours, depending upon the materials involved in the process.

During tank leaching (operation 114), gold from the ore goes into solution, resulting in pregnant leach solution. The pregnant leach solution also includes ore solids and the substrate that are preferably removed before the gold recovery operation(s). During tank leaching (operation 114), some of the slurry is continuously passed through the electrochemical cell of operation 104 to maintain a desired ORP (loop 106).

After leaching, the solids are removed (operation 116) through one or more operations, resulting in a pregnant leach solution. For example, removing solids (operation 116) preferably includes filtering or clarification, followed by filtering the underflow. Solids removed during operation 116 can also be subjected to a wash to recover any entrained pregnant leach solution. Other solids removal operations can include fewer or more processes.

When most or all of the solids above a predetermined size are removed from the pregnant solution, gold is recovered (operation 118). Preferably, all solids are removed from the pregnant solution before gold recovery (operation 118). In some instances, the pregnant solution is stored and/or transported to a different location before gold recovery. Gold recovery (operation 118) can include electroplating/electrowinning, precipitation, cementation, ion-exchange, and/or adsorption onto activated carbon, to extract the gold out of solution. The gold recovery operation (118) is preferably performed as a continuous process. However, gold recovery (operation 118) is optionally conducted as a batch process.

In some instances, electroplating (operation 118) cannot remove all the gold from solution. Thus, the embodiment of method 100 optionally includes one or more secondary gold recovery operations (120). Secondary gold recovery operations (120) take advantage of other properties of the precious metal to remove precious metal from solution.

In cases where other metals (e.g., copper, nickel, iron, etc.) are present in the leach solution, a preferable approach is to precipitate the metals by adjusting the pH to above 12.5, preferably above pH 12.8, to precipitate the gold and target materials. The solid precipitate can then be subjected to solid-liquid separation to remove the gold and metal-bearing solid precipitate.

Secondary gold recovery (operation 120) preferably includes passing the solution through one or more resin columns having ion exchange resin. An example ion exchange resin is anionic resin beads. Secondary gold recovery (operation 120) optionally includes, in place of or in addition to, passing the solution over activated carbon. Other secondary gold recovery operations are possible.

The barren solution from the gold recovery (operation 118) and secondary gold recovery (operation 120) are next subjected to leach solution recycle (operation 122). Leach solution recycle (operation 122) includes passing the solution through one or more electrochemical cells. That is, one or more cells having cathode(s) and anode(s). Leach solution recycle (operation 122) can also include adding or replenishing one or more of the additives added during operation 102 to bring each additive's concentration to a desired concentration amount.

The ORP of the solution can be monitored and used in determining the residence time of the solution or the flow rate of the solution through the electrochemical cell(s). Without being bound by a particular theory, passing the solution through the electrochemical cells is believed to reactivate/regenerate iodine, as well as other oxidants, in the solution.

In situations where gold is precipitated at a high pH, leach solution recycle (operation 122) can additionally include readjusting the pH of the leach solution. Lowering the pH is preferably performed before passing the leach solution through the electrochemical cell. Additionally, lowering the pH can raise the ORP back up to near target levels before the solution is regenerated in the (preferably divided) electrochemical cell.

The solution with the regenerated contents is then re-used and mixed with the reduced-in-size ore (operation 112).

III. Typical Materials and Preferred Amounts

The leaching solution is typically prepared by mixing carboxylic acid material and iodide material with water. Iodate material can also be included in the mixture. Typically, both iodate material and iodide material are added as sodium or potassium salts (e.g., potassium iodide and sodium iodate). Preferably, water soluble, carboxylic acid includes citric acid. Optionally, acetic acid is used as water-soluble, carboxylic acid. Alternatively, water soluble carboxylic acid includes both citric acid and acetic acid. Boric acid can be included in addition to, or instead of, citric acid and/or acetic acid.

Iodide material concentration in the aqueous solution is typically at least 1 g/L. Usually, iodide material concentration is not greater than 100 g/L. Preferably, iodide material concentration is 5-40 g/L inclusive.

The resulting solution is then subjected to electrical current from one or more electrodes for a period of time. Typically, the electrodes are included as part of a commercially-available electrochemical cell. Generally, a variety of electrode materials can be used with the methods and materials disclosed herein. Example electrodes include stainless steel electrodes, combination stainless steel and titanium electrodes, and carbon electrodes.

Voltages applied to the electrodes can vary depending upon the nature and design of a given electrochemical cell. Typically, a voltage of at least 1 V is applied. Typically, voltage applied does not exceed 30 V. In some implementations, leaching solution passes through an electrochemical cell. In other implementations, electrodes are introduced to a tank including the leaching solution. In those implementations, voltage is applied, typically, for 1-60 minutes, inclusive. Other durations are contemplated.

Typically, water soluble, carboxylic acid concentration is at least 1 g/L. Preferably, water soluble, carboxylic acid concentration is 1-50 g/L inclusive. In some instances, water soluble, carboxylic acid concentration is 10-35 g/L inclusive. In other instances, water soluble, carboxylic acid concentration is 5-20 g/L inclusive. Optionally, water soluble, carboxylic acid concentration is 15-30 g/L inclusive.

Boric acid is optionally added to the solution with the complexing agent. Typically, when present, boric acid concentration is at least 0.1 g/L but no more than 20 g/L. Preferably, when present, boric acid concentration is 0.5-3.5 g/L inclusive. In some instances, boric acid concentration is 1.5-8.0 g/L inclusive. Optionally, boric acid concentration is 2.0-5.0 g/L inclusive. Optionally, boric acid is 5.0-15 g/L inclusive.

Preferably, the leaching solutions disclosed herein have no cyanide (e.g. NaCN) added.

IV. Experimental Examples

FIGS. 3-8 show results of laboratory analyses of different leachate solutions and various substrates. The following examples are illustrative and other embodiments are within the scope of the present disclosure.

A. Test Set 1

Figure 3:
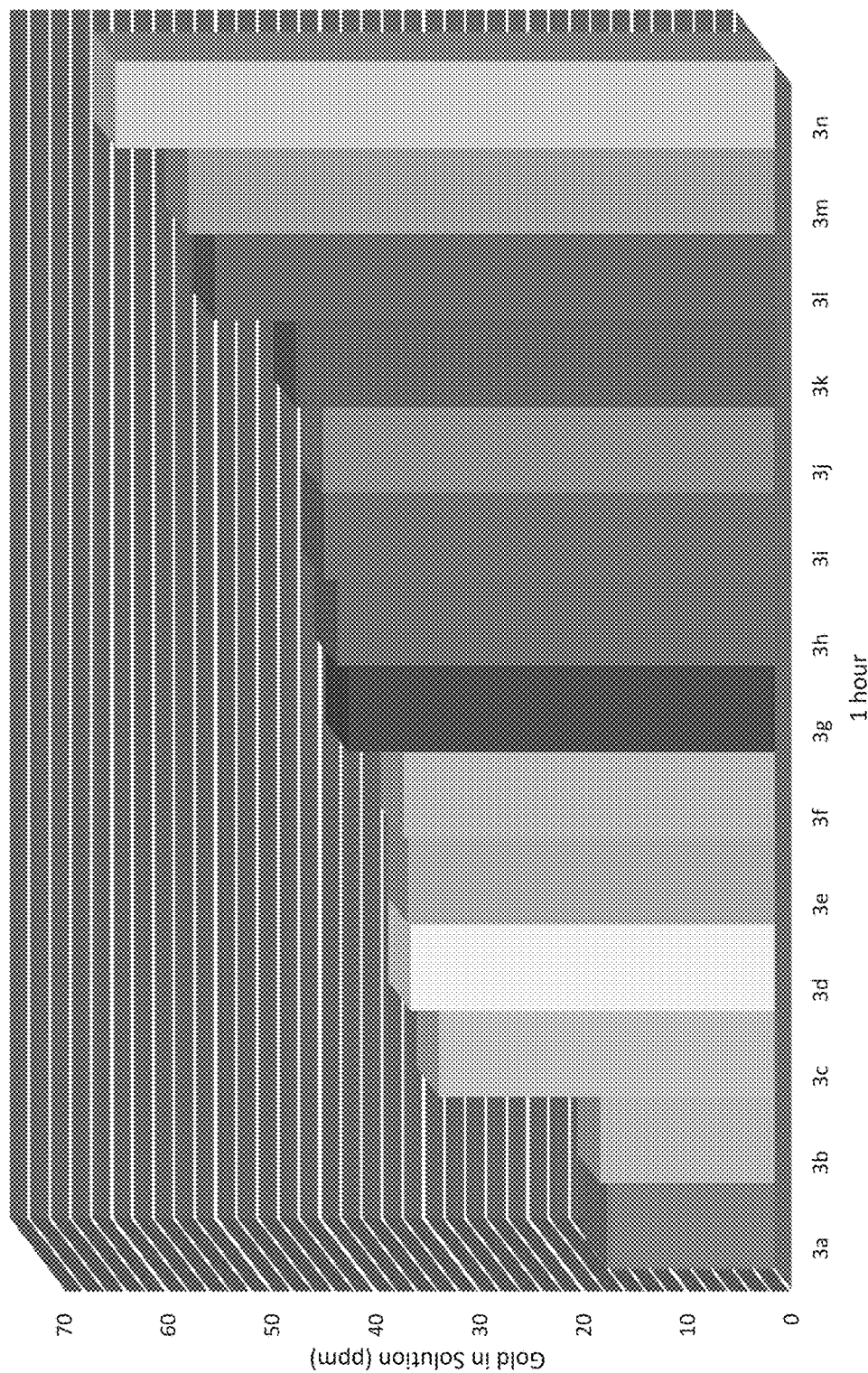
FIG. 3 is a graph showing experimental results described herein below.
Figure 4:
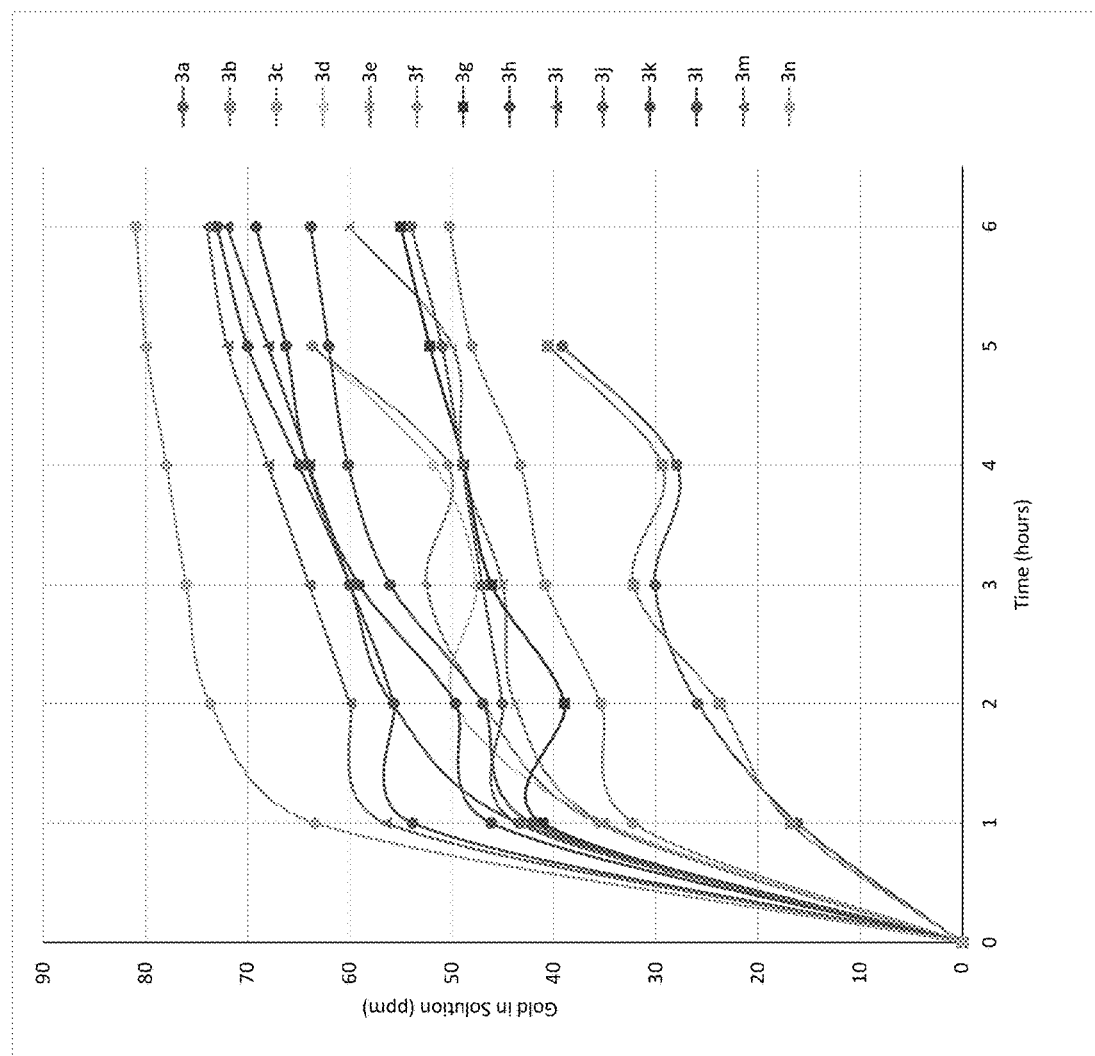
FIG. 4 is a graph showing experimental results, including data of FIG. 3, described herein below.

FIGS. 3-4 illustrate results of laboratory analyses of fourteen different leachate solutions, labeled 3a-3n, contacted with froth flotation gold concentrate from a mine located in British Columbia, Canada. FIG. 3 is a bar chart showing gold parts per million in solution after 1 hour of leaching. FIG. 4 is a plot showing the ppm of gold in solution for the fourteen leachate solutions in FIG. 3 over a period of time greater than 1 hour, with measurements recorded every 60 minutes. The results are presented in Table 1 below. Leachate solutions 3l, 3n, and 3m are discussed below in Examples 1, 2 and 3, respectively.

TABLE 1

Concentration of gold in solution (in parts per million) after leaching for 1-6 hours.

| | Mixture | | Gold in solution (ppm) | | | | | |
|---|---|---|---|---|---|---|---|---|
| | Citric | | | | | | | |
| Label | Acid (g/L) | Boric Acid (g/L) | 1 hour | 2 hours | 3 hours | 4 hours | 5 hours | 6 hours |
| 3a | 0 | 0 | 16 | 26 | 30 | 28 | 39 | |
| 3b | 0 | 2 | 17 | 24 | 32 | 29 | 41 | |
| 3c | 2 | 7 | 32 | 35 | 41 | 43 | 48 | 50 |
| 3d | 5 | 0 | 35 | 50 | 48 | 52 | 64 | |
| 3e | 0 | 2 | 35 | 44 | 45 | 49 | 50 | 60 |
| 3f | 5 | 2 | 36 | 47 | 53 | 50 | 64 | |
| 3g | 2 | 2 | 41 | 39 | 46 | 49 | 52 | 55 |
| 3h | 7 | 2 | 42 | 47 | 56 | 60 | 62 | 64 |
| 3i | 1.3 | 0 | 43 | 56 | 60 | 64 | 68 | 72 |
| 3j | 20 | 2 | 43 | 45 | 47 | 49 | 51 | 54 |
| 3k | 7 | 7 | 46 | 50 | 59 | 64 | 66 | 69 |
| 3l | 10 | 0 | 54 | 56 | 60 | 65 | 70 | 73 |
| 3m | 15 | 2 | 56 | 60 | 64 | 68 | 72 | 74 |
| 3n | 10 | 2 | 63 | 74 | 76 | 78 | 80 | 81 |

The following examples are illustrative and other embodiments are within the scope of the present disclosure.

1. Example 1—Leachate Solution 3l

An example embodiment of the leaching solution was prepared and the gold recovery analyzed. The leaching solution was prepared by adding 25 g KI and 3 g NaCl to 1 L of tap water in a 2 L beaker. The contents were agitated with a magnetic stirrer. Then, a stainless steel cathode and a titanium anode were placed into the solution. The electrodes were electrified at 6 V (0.5 amps) for 15 minutes. Then, 10 g of citric acid, $C_6H_8O_7$, were added and the contents stirred using the magnetic stirrer. The resulting solution was the leaching solution.

Next, 100 mL of the leaching solution was added to 33.3 g of test material in a 500 mL bottle container. The test material was froth flotation gold concentrate. The 500 mL bottle container was placed on rollers that provide constant agitation.

Every 60 minutes, the bottle was opened and 1 mL of fluid was drawn out and combined with 6 mL of deionized water in a 16 mL test tube. The test tube was placed into a centrifuge for 2 minutes at 1,000 rpm, which accelerated the settling of the solids.

Then gold concentration of the clarified solution in the test tube was measured using an atomic absorption spectroscopy machine. Two measurements were recorded. From the measurements obtained, the amount of gold in solution was determined in terms of parts per million (ppm). After 60 minutes, gold was present at 54 ppm.

A leachate solution with 0 g citric acid (the "standard") had 16 ppm gold after one hour. Thus, the leaching solution of Example 1 recovered 38 ppm more than the standard solution, an improvement of 238%. Without being bound by a particular theory, the data in FIGS. 3-5 appear to suggest that citric acid improves gold recovery/solubility in solution.

2. Example 2—Leachate Solution 3n

An example embodiment of the leaching solution was prepared and the gold recovery analyzed. The leaching solution was prepared by adding 25 g KI and 3 g NaCl to 1 L of tap water in a 2 L beaker. The contents were agitated with a magnetic stirrer. Then, a stainless steel cathode and a titanium anode were placed into the solution. The electrodes were electrified at 6 V (0.5 amps) for 15 minutes. Then, 10 g of citric acid, $C_6H_8O_7$, and 2 g of boric acid, $H_3BO_3$, were added and the contents stirred using the magnetic stirrer. The resulting solution was the leaching solution.

Next, 100 mL of the leaching solution was added to 33.3 g of test material in a 500 mL bottle container. The test material was froth flotation gold concentrate. The 500 mL bottle container was placed on rollers that provide constant agitation.

Every 60 minutes, the bottle was opened and 1 mL of fluid was drawn out and combined with 6 mL of deionized water in a 16 mL test tube. The test tube was placed into a centrifuge for 2 minutes at 1,000 rpm, which accelerated the settling of the solids.

Then the gold concentration of the clarified solution in the test tube measured using an atomic absorption spectroscopy machine. Two measurements were recorded. From the measurements obtained, the amount of gold in solution was determined in terms of parts per million (ppm). After 60 minutes, gold was present at 63 ppm.

Thus, the leaching solution of Example 2 had 47 ppm more gold in solution than the standard solution. This is an improvement of 294% over the standard solution. Without being bound by a particular theory, the addition of boric acid to the leaching solution of Example 1 improved the gold recovery.

3. Example 3—Leachate Solution 3m

An example embodiment of the leaching solution was prepared and the gold recovery analyzed. The leaching solution was prepared by adding 25 g KI and 3 g NaCl to 1 L of tap water in a 2 L beaker. The contents were agitated with a magnetic stirrer. Then, a stainless steel cathode and a titanium anode were placed into the solution. The electrodes were electrified at 6 V (0.5 amps) for 15 minutes. Then, 15 g of citric acid, $C_6H_8O_7$, and 2 g of boric acid, $H_3BO_3$, were added and the contents stirred using the magnetic stirrer. The resulting solution was the leaching solution.

Next, 100 mL of the leaching solution was added to 33.3 g of test material in a 500 mL bottle container. The test material was froth flotation gold concentrate. The 500 mL bottle container was placed on rollers that provide constant agitation.

Every 60 minutes, the bottle was opened and 1 mL of fluid was drawn out and combined with 6 mL of deionized water in a 16 mL test tube. The test tube was placed into a centrifuge for 2 minutes at 1,000 rpm, which accelerated the settling of the solids.

Then the gold concentration of the clarified solution in the test tube was measured using an atomic absorption spectroscopy machine. Two measurements were recorded. From the measurements obtained, the amount of gold in solution was determined in terms of parts per million (ppm). After 60 minutes, gold was present at 56 ppm.

Thus, the leaching solution of Example 3 had 40 ppm more gold in solution than the standard solution. However, the recovery of the leaching solution of Example 3 was less than Example 2. Without being bound by a particular theory, the addition of 5 g more citric acid to the leaching solution of Example 2 did not improve gold recovery. This is confirmed by the test leaching solution having 20 g citric acid and 2 g boric acid, which had 43 ppm gold after 1 hour, less than each of Examples 1, 2 and 3.

B. Test Set 2

FIGS. 5-8 are plots showing gold recovered into solution for different leachate solutions expressed as a percentage, with various substrates, over a period of time.

1. Example 1—Froth Flotation Concentrate

Figure 5:
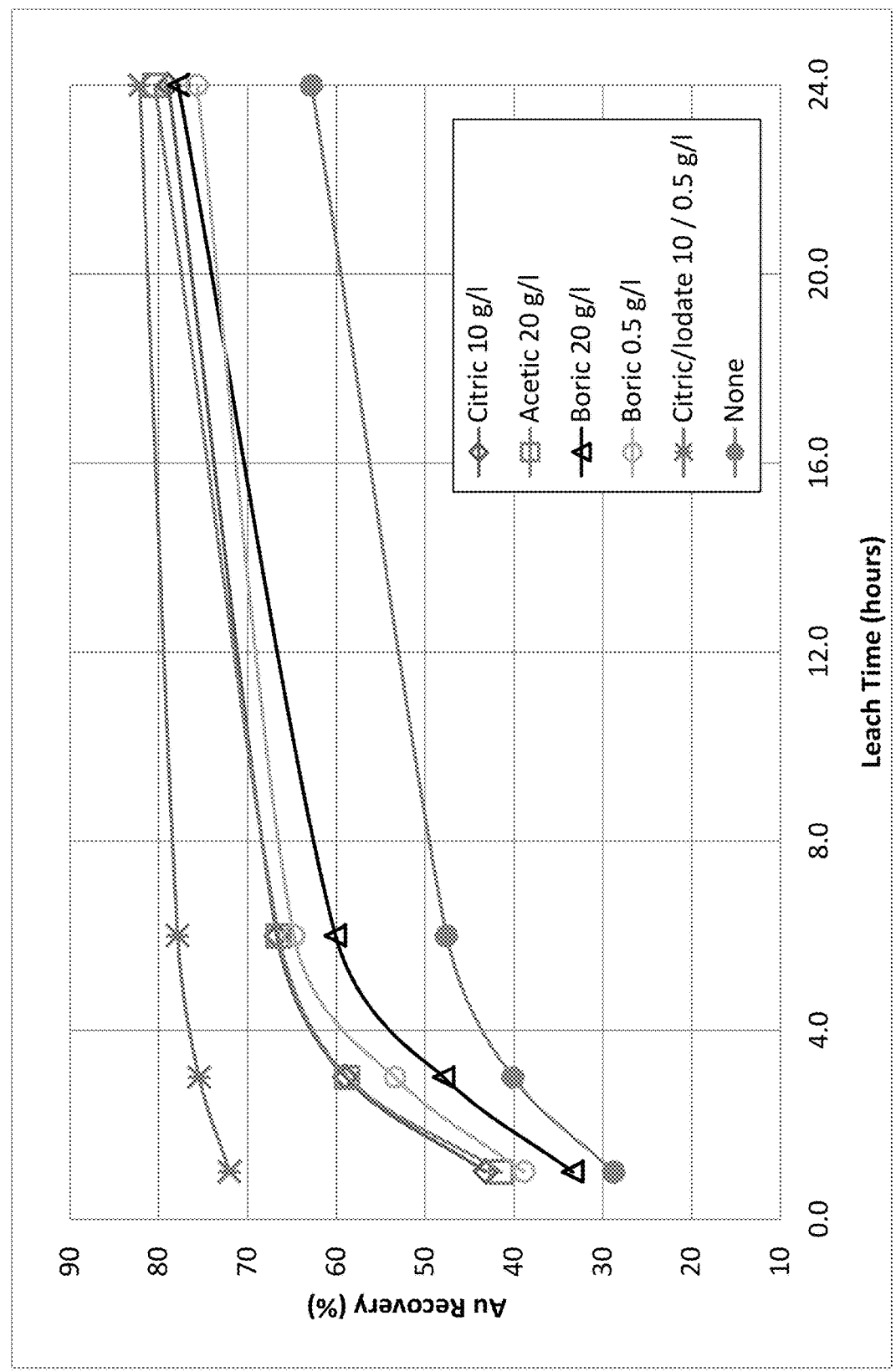
FIG. 5 is a graph showing experimental results described herein below.

Various leaching solutions were prepared and the gold recovery from froth flotation concentrate analyzed. The results of gold recovery with various leaching solutions are shown in FIG. 5 and in Table 2 below.

TABLE 2

Gold recovery percentage for various test leaching solutions over time for froth flotation concentrate sample.

| Test | Additive Type | Additive Conc. (g/L) | Gold Recovery (%) after | | | |
|---|---|---|---|---|---|---|
| | | | 1 hour | 3 hours | 6 hours | 24 hours |
| IB321 | Citric acid | 10 | 43.2 | 59.0 | 66.7 | 78.9 |
| IB322 | Acetic acid | 20 | 41.4 | 58.8 | 66.5 | 80.4 |
| IB323 | Boric acid | 20 | 33.4 | 47.9 | 60.1 | 77.8 |
| IB281 | Boric acid | 0.5 | 38.9 | 53.4 | 64.8 | 75.7 |
| AH103 | Citric acid/ Iodate | 5.0/0.5 | 72.0 | 75.4 | 77.9 | 82.2 |
| AH104 | None | 0 | 28.8 | 40.1 | 47.6 | 62.8 |

Each leaching solution was prepared by mixing tap water with 40 g/L KI and 1.5 g/L NaCl. All but one test solution had one or more additional additives added to the water/KI/NaCl mixture. For test solution IB321, 10 g/L citric acid was also added. For test solution IB322, 20 g/L acetic acid was also added. For test solution IB323, 20 g/L boric acid was also added. For test solution IB281, 0.5 g/L boric acid was also added. For test solution AH103, 5.0 g/L citric acid and 0.5 g/L iodate were also added. For test solution AH104, no additional additives were added to the KI, NaCl, and water mixture. The contents of each test solution were agitated with a magnetic stirrer.

After mixing, each solution was passed through an electrochemical cell to generate a leaching solution. Froth flotation concentrate sample was then mixed with the test leaching solution at a pulp density of 25%. In this example, froth flotation concentrate was produced from mined ore from British Columbia, Canada.

The resulting slurry (combination of froth flotation concentrate and leaching solution) was then continuously leached in an agitated vessel for 24 hours. Samples of the slurry were obtained and assayed at increments of 1, 3, 6 and 24 hours.

After 24 hours, the solids were separated from the solution and washed. Solution samples were placed in test tubes. Then the gold concentration in each test tube was measured using an atomic absorption spectroscopy machine. From the measurements obtained, the amount of gold in solution was determined in terms of parts per million (ppm). The recovery of gold was calculated for each sample. Results of the calculated gold recoveries are shown in FIG. 5.

Without being bound by a particular theory, the results in FIG. 5 show that addition of additive (citric acid, acetic acid, boric acid, and/or iodate) improves the gold recovery of the leaching solution as compared to no additives. The results in FIG. 5 also show that citric acid and acetic acid provide similar gold recoveries over 24 hours. The results in FIG. 5 also show that boric acid performs slightly worse than citric acid and boric acid. The results in FIG. 5 show that the best recoveries were achieved with the addition of citric acid and potassium iodate. Iodate additional also provided faster leach rates.

2. Example 2—Gravity Concentrate

Figure 6:
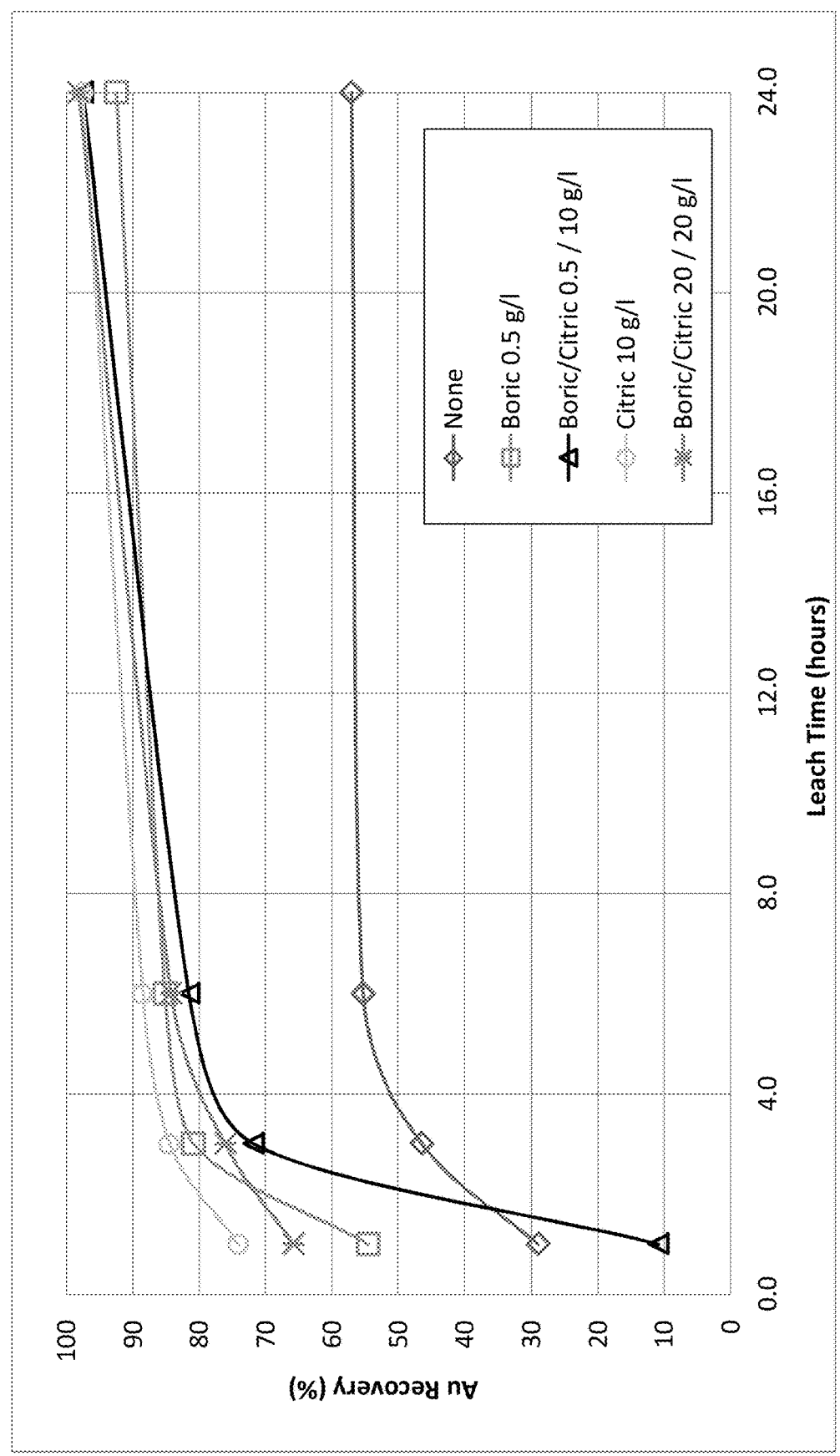
FIG. 6 is a graph showing experimental results described herein below.

Various leaching solutions were prepared and the gold recovery from gravity concentrate analyzed. The results of gold recovery with various leaching solutions are shown in FIG. 6 and in Table 3 below.

TABLE 3

Gold recovery percentage for various test leaching solutions over time for gravity concentrate sample.

| Test | Additive Type | Additive Conc. (g/L) | Gold Recovery (%) after | | | |
|---|---|---|---|---|---|---|
| | | | 1 hour | 3 hours | 6 hours | 24 hours |
| IB271 | None | 0 | 29.0 | 46.4 | 55.3 | 57.1 |
| IB235 | Boric acid | 0.5 | 54.6 | 80.8 | 85.1 | 92.5 |
| IB282 | Boric acid/Citric acid | 0.5/10 | 10.8 | 71.8 | 81.5 | 97.5 |
| IB283 | Citric acid | 10 | 74.1 | 84.4 | 88.5 | 97.6 |
| IB291 | Boric acid/Citric acid | 20/20 | 65.8 | 76.0 | 84.2 | 98.1 |

Each leaching solution was prepared by mixing tap water with 40 g/L KI and 1.5 g/L NaCl. All but one test solution had one or more additional additives added to the mixture. For test solution IB271, no additional additives were added to the KI, NaCl, and water mixture. For test solution IB235, 0.5 g/L boric acid was also added. For test solution IB282, 0.5 g/L boric acid and 10 g/L citric acid were also added. For test solution IB283, 10 g/L citric acid was also added. For test solution IB291, 20 g/L boric acid and 20 g/L citric acid were also added. The contents of each test solution were agitated with a magnetic stirrer.

After mixing, each solution was passed through an electrochemical cell to generate a leaching solution. Gravity concentrate sample was then mixed with the test leaching solution at a pulp density of 25%. In this example, gravity concentrate was obtained from a centrifugal gravity gold concentrator operating at a mine in Arizona.

The resulting slurry (combination of gravity concentrate and leaching solution) was then continuously leached in an agitated vessel for 24 hours. Samples of the slurry were obtained and assayed at increments of 1, 3, 6 and 24 hours.

After 24 hours, the solids were separated from the solution and washed. Solution samples were placed in test tubes. Then the gold concentration in each test tube was measured using an atomic absorption spectroscopy machine. From the measurements obtained, the amount of gold in solution was determined in terms of parts per million (ppm). The recovery of gold was calculated for each sample. Results of the calculated gold recoveries are shown in FIG. 6.

Without being bound by a particular theory, the results in FIG. 6 show that addition of additive (citric acid or boric acid) improves the gold recovery of the leaching solution as compared to no additives. The results in FIG. 6 also show that gold recovery improved with citric acid as the additive as compared to boric acid. The results in FIG. 6 also show that each solution with citric acid performed relatively similarly with respect to gold recovery.

3. Example 3—E-Waste

Figure 7:
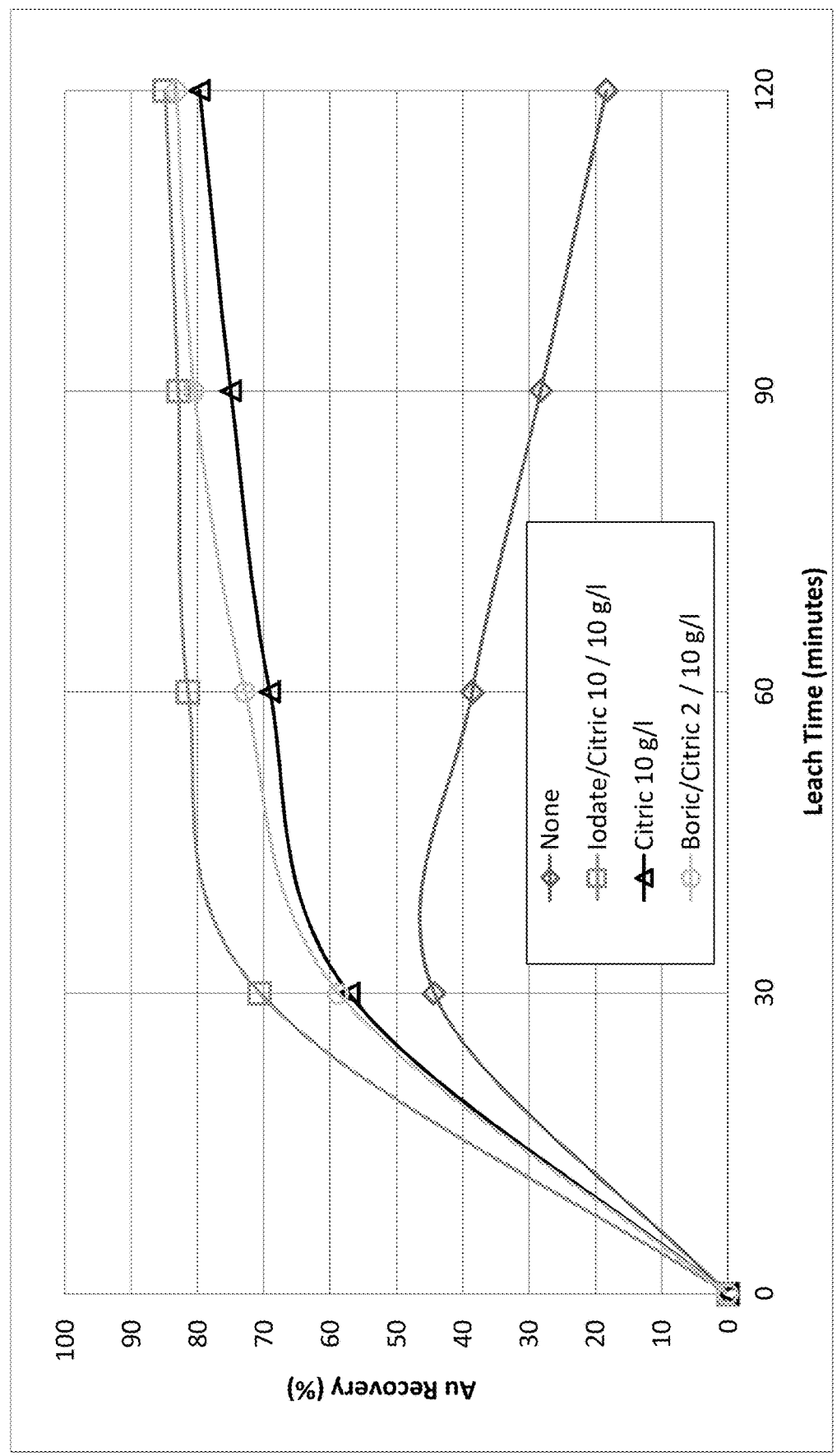
FIG. 7 is a graph showing experimental results described herein below.

Various leaching solutions were prepared and the gold recovery from e-waste sample analyzed. The results of gold recovery with various leaching solutions over time are shown in FIG. 7 and in Table 4 below.

TABLE 4

Gold recovery percentage for various test leaching solutions over time for e-waste sample.

| Test | Additive Type | Additive Conc. (g/L) | Gold Recovery (%) after | | | |
|---|---|---|---|---|---|---|
| | | | 30 Min | 60 Min | 90 Min | 120 Min |
| J101 | None | 0 | 44.3 | 38.6 | 28.2 | 18.4 |
| J102 | Iodate/Citric acid | 10/10 | 70.6 | 81.4 | 82.9 | 84.9 |
| J103 | Citric acid | 10 | 57.2 | 69.1 | 75.0 | 79.7 |
| J104 | Boric acid/Citric acid | 2/10 | 58.7 | 72.8 | 80.5 | 83.2 |

Each leaching solution was prepared by mixing tap water with 60 g/L KI. All but one test solution had one or more additional additives added to the water/KI mixture. For test solution J101, no additional additives were added to the KI and water mixture. For test solution J102, 10 g iodate and 10 g citric acid were also added to the beaker. For test solution J103, 10 g citric acid was also added to the beaker. For test solution J104, 2 g boric acid and 10 g citric acid were also added to the beaker. The contents of each test solution were agitated with a magnetic stirrer.

After mixing, each solution was passed through an electrochemical cell to generate a leaching solution. E-waste sample was then mixed with the test leaching solution at a pulp density of 25%. In this example, e-waste sample included ground electronic waste (such as circuit boards) passed through a 70 mesh screen.

The resulting slurry (combination of e-waste material and leaching solution) was then continuously leached in an agitated vessel for 120 minutes. Samples of the slurry were obtained and assayed at increments of 30, 60, 90 and 120 minutes.

After 120 minutes, the solids were separated from the solution and washed. Solution samples were placed in test tubes. Then the gold concentration in each test tube was measured using an atomic absorption spectroscopy machine. From the measurements obtained, the amount of gold in solution was determined in terms of parts per million (ppm).

The recovery of gold was calculated for each sample. Results of the calculated gold recoveries are shown in FIG. 7.

Without being bound by a particular theory, the results in FIG. 7 show that not including an additive in the leaching solution was detrimental to the stability of gold in solution. Including additives appears to prevent gold from precipitating out of solution. The results in FIG. 7 also suggest that solutions with boric acid and citric acid had similar gold recoveries, with leaching solutions including citric acid performing only slightly better. The results in FIG. 7 also show that the best gold recovery was achieved with the addition of both citric acid and potassium iodate to the leaching solution.

4. Example 4—E-Waste Pilot Plant

Figure 8:
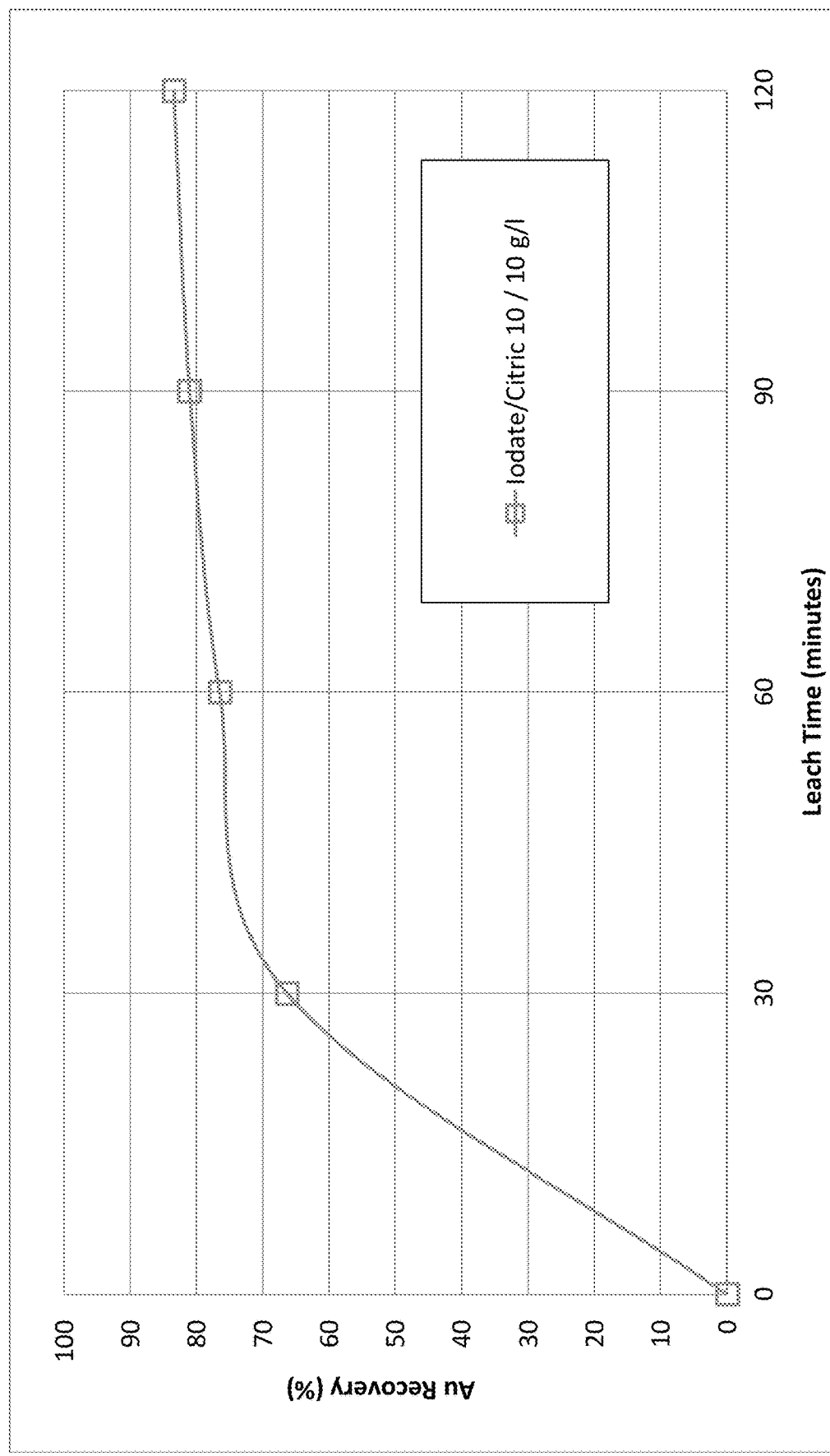
FIG. 8 is a graph showing experimental results described herein below.

A leaching solution was prepared and the gold recovery from e-waste sample analyzed. This example utilized a pilot plant as described in the section below titled "Third Example Hypothetical Process". The results of gold recovery with the leaching solution over time are shown in FIG. 8 and in Table 5 below.

TABLE 5

Gold recovery percentage for a test leaching solution in a pilot plant over time for e-waste sample.

| Test | Additive Type | Additive Conc. (g/l) | Gold Recovery (%) after | | | |
|---|---|---|---|---|---|---|
| | | | 30 Min | 60 Min | 90 Min | 120 Min |
| Pilot | Citric/Iodate | 10/10 | 66.4 | 76.5 | 81.0 | 83.4 |

The leaching solution was prepared by adding 50 g/L KI, 10 g/L citric acid, and 10 g/L potassium iodate to 100 L of tap water. The contents of the test solution were agitated with a magnetic stirrer.

After mixing, each solution was passed through an electrochemical cell to generate a leaching solution having an ORP of 590 mV (SHE). E-waste sample was then mixed with the test leaching solution at a pulp density of 14%. In this example, e-waste sample included ground electronic waste (such as circuit boards) passed through a 100 mesh screen.

The resulting slurry (combination of gravity concentrate and leaching solution) was then continuously passed through the electrochemical cell to maintain the ORP at or above 590 mV (SHE). The resulting slurry was then continuously leached in an agitated vessel for 120 minutes. Samples of the slurry were obtained and assayed at increments of 30, 60, 90 and 120 minutes.

After 120 minutes, the solids were separated from the solution and washed. Solution samples were placed in test tubes. Then the gold concentration in each test tube was measured using an atomic absorption spectroscopy machine. From the measurements obtained, the amount of gold in solution was determined in terms of parts per million (ppm). The recovery of gold was calculated for each sample. Results of the calculated gold recoveries are shown in FIG. 8.

The results in FIG. 8 show the stability and scalability of the process. In contrast to the examples 1-3 discussed above (those referring to FIGS. 5-7), this is the only example where the slurry was continuously passed through the electrochemical cell to maintain the ORP. Thus, this example proved up the lab-scale processes described with reference to examples 1-3 (results shown in FIGS. 5-7).

VI. Example Hypothetical Process Using Materials and Techniques Characterized Herein In a hypothetical precious metal recovery operation, gravity concentrate including precious metal is received from a mining operation. The gravity concentrate is processed to reduce the size in a mill, where the concentrate exiting the output of the mill generally has a size not greater than 2000 μm.

Separately, in an agitated tank, water is combined with potassium iodide, potassium iodate, and citric acid, and agitated. The potassium iodide is added to the tank in an amount of 25 grams per liter. The potassium iodate is added to the tank in an amount of 25 grams per liter. The citric acid is added to the tank in an amount of 10 grams per liter.

Next, the water-additive mixture is pumped to a process tank including electrodes. An ORP meter is positioned such that it can record measurements of the process tank contents.

A voltage of 6 V is provided to each electrode in the process tank. When the ORP meter indicates a predetermined level has been reached, the voltage to the electrodes is stopped. The aqueous solution is enhanced and ready for leaching.

The gravity concentrate from the mill is delivered to an agitated leach tank. Leaching in the agitated leach tank proceeds for a predetermined amount of time, such as, for example, 12 hours.

The leach solution including solids is then pumped through a filter press to separate the solids from the solution.

Solution passing through the filter press is sent to an electrowinning cell. The output from the electrowinning cell is pumped through activated carbon.

Solution passing through the carbon resin is pumped to an electrode-containing cell. The output from the electrode-containing cell is pumped back to the agitated leach tank.

VII. Second Example Hypothetical Process Using Materials and Techniques Characterized Herein In a hypothetical precious metal recovery operation, mined ore including precious metal is received from a mining operation. The mined ore is processed to reduce the size in a mill, where the ore exiting the output of the mill generally has a size not greater than 250 μm.

Separately, in an agitated tank, water is combined with: anywhere between 10 grams per liter to 40 grams per liter potassium iodide, 40 grams per liter sodium iodate, 1.5 grams per liter citric acid monohydrate, 1.5 grams per liter boric acid, and anywhere between 5 mL per liter to 20 mL per liter glacial acetic acid. The combination is then agitated.

Next, the mixture is pumped to a process tank including electrodes. An ORP meter is positioned such that it can record measurements of the process tank contents.

The mixture is subjected to electrolysis using a carbon anode and stainless steel cathode until the oxidation reduction potential (ORP) of the mixture is a minimum of 540 mV SHE, more preferably a minimum of 570 mV SHE. Alternatively, platinum or titanium cathodes can be used.

The ore from the mill is delivered to the process tank. Ore is added to the mixture and agitated to create a slurry of 10% to 25% ore volume by weight. Electrolysis then continues for the required leach cycle duration to maintain the ORP levels.

After a predetermined amount of time, for example, 12 hours or 24 hours, the leach solution including solids is then pumped through a filter press to separate the solids from the solution.

Solution passing through the filter press is sent to an electrowinning cell. The output from the electrowinning cell is pumped through activated carbon. Solution passing through the activated carbon is pumped to an electrode-containing cell. The output from the electrode-containing cell is pumped to the back to the agitated leach tank.

VII. Third Example Hypothetical Process Using Materials and Techniques Characterized Herein In a hypothetical precious metal recovery operation, flotation concentrate solids including precious metal are received from a mining operation.

Separately, in a leaching tank, water is combined with potassium iodide, potassium iodate, and citric acid, and agitated. The potassium iodide is added to the tank in an amount of 40 grams per liter. The potassium iodate is added to the tank in an amount of 10 grams per liter. The citric acid is added to the tank in an amount of 5 grams per liter. The resulting contents are termed a "water-additive mixture".

An ORP probe is positioned in the leaching tank so that the ORP probe can measure the ORP of the solution.

Next, the water-additive mixture is pumped through an electrochemical cell and returned back to the tank until the measured ORP of the water-additive mixture is raised to a value of at least 570 mV (vs SHE). The aqueous solution is enhanced and ready for leaching.

The concentrate from a mill is delivered to the leach tank to make a slurry with a pulp density of 10-35% by weight. Leaching in the leach tank proceeds for 20 hours. The slurry is continuously pumped through the electrochemical cell to maintain the ORP above 570 mV (SHE).

After a predetermined amount of time, such as 20 hours, the leach solution (pregnant leach solution or "PLS") including the solids are pumped through a filter. Wash water is pumped through the filter to recover entrained PLS.

Solution and wash water passing through the filter press is sent to a divided electrochemical cell to recover gold by electrowinning. In addition, or alternatively, gold is recovered by precipitation. The solids are discarded.

VII. Example Theoretical Chemistry During Processes and Techniques Characterized Herein Without being bound by a particular theory, it is theorized that the following reactions take place during one or more of the processes and techniques characterized herein. Gold leaching with iodine/iodide takes place via the following reactions:

$$2Au + I^- + I_3^- \rightarrow 2AuI_2^- \quad (5)$$

$$2Au + 3I_3^- \rightarrow 2AuI_4^- + I^- \quad (6)$$

The addition of carboxylic acids and boric acid have been shown to accelerate the leaching rate and stabilize gold in solution.

The addition of iodate (as, e.g., $KIO_3$) and an acid to the leaching solution can result in a rapid increase in the ORP level via the following reaction:

$$IO_3^- + 2I^- + 6H^+ \rightarrow I_3^- + 3H_2O \quad (7)$$

An electrochemical cell is used to maintain or increase the ORP over and above the ORP achieved from reaction (7) above. The reaction on the anode in the electrochemical cell generates a triiodide species required for leaching according to the following reaction:

$$3I^- \rightarrow I_3^- + 2e^- \quad (8)$$

The reaction at the cathode in the electrochemical cell is:

$$2H_2O + 2e^- \rightarrow H_2 + 2OH^- \quad (9)$$

When iodine and iodide are present in a system, a result is the formation of the triiodide ion. In the systems disclosed herein, any iodine produced will typically lead to the formation of triiodide because there are typically always iodide ions present in the system $$I_2 + I^- = I_3^- \quad (10)$$

If chloride (which can be a source of chlorine to produce hypochlorite electrochemically in the cell) or if hypochlorite is added to the system, the following reactions can also take place to produce iodine:

$$2I^- + Cl_2 \rightarrow +I_2 + 2Cl^- \quad (11)$$

$$Cl_2 + 2OH^- \rightarrow H_2O + Cl^- + ClO^- \quad (12)$$

$$ClO^- + 2H^+ + 2I^- \rightarrow I_2 + Cl^- + H_2O \quad (13)$$

Addition of bromides will have a similar effect as that provided above.

Gold and other metals in solution can be recovered via the various methods described above. However, in the case of e-waste, one preferred route is to raise the pH with the addition of a hydroxide, such as sodium or potassium hydroxide, to precipitate the metals. A result of hydroxide addition to a solution to raise the pH above 12.5 converts much of the iodine species to iodate, as follows:

$$3I_2 + 6OH^- \rightarrow 5I^- + IO_3^- + 3H_2O \quad (14)$$

Once the precipitated gold and metals are removed, the resulting clarified solution is referred to as a "barren solution". The barren solution including the iodide and iodate is then treated for recycle to be used for leaching. One possible way the solution can be treated for recycle is to lower the pH. If the material has been subjected to precipitation, such as when processing e-waste, acid material is added to the barren solution to lower the pH back down below pH 12 to approximately neutral levels. In this approach, triiodide is created as shown in reaction (7) above. A number of different acids, inorganic or organic, can be used in this step (e.g., sulfuric acid, hydrochloric acid, citric acid, boric acid, etc.).

Then the barren solution is treated through a divided electrochemical cell with the leaching solution (anolyte) passing through the anode side of the cell and a hydroxide solution (catholyte) on the cathode side. The reaction on the anode side is shown above as reaction (8). Electrochemical cell treatment is conducted until a desired ORP is achieved. Then the regenerated leaching solution is available for leaching again.

It will be clear that the systems and methods described herein are well adapted to attain the ends and advantages mentioned as well as those inherent therein. Those skilled in the art will recognize that the methods and systems within this specification can be implemented in many manners and as such is not to be limited by the foregoing exemplified embodiments and examples. In this regard, any number of the features of the different embodiments described herein can be combined into one single embodiment and alternate embodiments having fewer than or more than all of the features herein described are possible.

It will be clear that the systems and methods described herein are well adapted to attain the ends and advantages mentioned as well as those inherent therein. Those skilled in the art will recognize that the methods and systems within this specification can be implemented in many manners and as such is not to be limited by the foregoing exemplified embodiments and examples. While various embodiments have been described for purposes of this disclosure, various changes and modifications can be made which are well within the scope of the present disclosure. Numerous other changes can be made which will readily suggest themselves to those skilled in the art and which are encompassed in the spirit of the disclosure.

What is claimed is:

1. A method of recovering a precious metal using an aqueous-based leaching solution, the method including the steps of:
   (a) passing a leaching solution precursor through an electrochemical cell to form the aqueous-based leaching solution, wherein the leaching solution precursor comprises:
   a boric acid material;
   an iodate material;
   an iodide salt material; and
   a carboxylic acid material comprising acetic acid and/or citric acid;
   (b) contacting a substrate including the precious metal with the aqueous-based leaching solution, contacting resulting in a pregnant leach solution;
   (c) recovering the precious metal from the pregnant leach solution, thereby generating a barren aqueous-based leaching solution;
   (d) passing current through the barren aqueous-based solution to increase an oxidation reduction potential (ORP) of the barren aqueous-based solution, thereby generating a regenerated solution; and
   (e) contacting the regenerated solution with the substrate including the precious metal;
   wherein the precious metal comprises gold.

2. The method of claim 1, wherein the ORP of the aqueous-based leaching solution is at or above 540 mV SHE.

3. The method of claim 2, wherein passing current through the barren aqueous-based solution includes passing the barren aqueous-based solution through an electrochemical cell.

4. The method of claim 3, further comprising: prior to passing current through the barren aqueous-based solution, adding supplemental carboxylic acid material to the barren aqueous-based leaching solution,
   wherein contacting the substrate including the precious metal with the aqueous-based leaching solution includes tank leaching; and
   wherein, during tank leaching, a portion of the aqueous-based leaching solution is passed through a second electrochemical cell.

5. The method of claim 2, wherein the leaching solution precursor contains from 1 to 100 grams per liter of the iodide salt material.

6. The method of claim 5, wherein the leaching solution precursor contains from 0.1 to 20 grams per liter of the boric acid material.

7. The method of claim 1, wherein the iodate material comprises sodium iodate and/or potassium iodate.

8. The method of claim 7, wherein the iodide salt material comprises potassium iodide and/or sodium iodide.

9. The method of claim 1, wherein the leaching solution precursor further comprises a chloride salt material or a bromide salt material.

10. The method of claim 1, wherein the leaching solution precursor has a pH of at least 3 but no greater than 10.

11. The method of claim 1, wherein the leaching solution precursor has a pH of at least 4 but no greater than 7.

12. The method of claim 1, wherein the leaching solution precursor contains:
   at least 5 grams per liter of the iodide salt material; and
   from 1 to 50 grams per liter of the carboxylic acid material.

13. The method of claim 12, wherein the leaching solution precursor contains from 0.1 to 20 grams per liter of the boric acid material.

14. The method of claim 1, wherein the leaching solution precursor contains from 1 to 100 grams per liter of the iodide salt material.

* * * * *